Fig. 1

INVENTOR
Lawrence F. Hemphill
BY Adolph C. Hugin
ATTORNEY

Nov. 5, 1968  L. F. HEMPHILL  3,408,818
CAPILLARY SUBTERRANEAN IRRIGATION SYSTEM
Filed June 6, 1966  3 Sheets-Sheet 3

INVENTOR
Lawrence F. Hemphill

BY  Adolph C. Hugin
ATTORNEY

3,408,818
CAPILLARY SUBTERRANEAN IRRIGATION SYSTEM
Lawrence F. Hemphill, 644 Benvenue Ave., Los Altos, Calif. 94022
Filed June 6, 1966, Ser. No. 555,372
7 Claims. (Cl. 61—13)

ABSTRACT OF THE DISCLOSURE

A subterranean irrigation system having longitudinally extending level perforated water distributing conduits in trenches lined with water imperforate sheets extending part way up the sides of the trenches at least higher than the conduits. A water supply system formed by headers connected to the conduits and interconnected to assure a predetermined free water level in the soil adjacent to each conduit, the trenches being filled with capillary feed material over the conduits and in contact with the adjacent soil for feeding the water thereto. A visual water flow indicator may be used by connecting it between the water source and the headers with a readily visible open flow therein. A suitable supply valve, such as a float valve, responsive to water level in the lowest header, controls the supply of water to the system.

---

This invention relates to soil irrigation systems and more particularly to a subterranean irrigation system employing the capillary action of a water transmitting medium in communication with an underground water distributing conduit.

An object of this invention is to provide an improved subterranean irrigation system in which moisture is supplied to vegetation growing soil by capillary action through a capillary water feeding medium.

Another object of this invention is to provide an improved subterranean irrigation system which utilizes the capillary action in a capillary-feed medium for supplying water from a water supply to vegetation growing soil, and which may be left turned on in all kinds of weather all year in climates not subject to severely cold winters.

A further object of this invention is to provide a subterranean irrigation system employing the capillary action of a water capillary-feed medium for supplying water to vegetation growing soil from a subsoil water supply wherein a predetermined free water level is maintained in the capillary feeding material for providing a predetermined pattern and degree of moisture in the soil.

Yet another object of this invention is to provide an improved subterranean irrigation system which requires very little servicing and maintenance and which is fully automatic in operation for the maintenance of a regulatable predetermined pattern and degree of soil moisture content.

A yet further object of this invention is to provide an improved subterranean irrigation system utilizing one or more trenches, each having a water impermeable line which covers the bottom of the trench and the sides of the trench to a height intermediate to the surface of the soil and the depth of the roots of plants to be irrigated by the system with a water supply in the bottom of the trench which provides for the flow of water from one end of the trench to the other. This trench bottom water supply is provided with a water feeding communication with the capillary-feed material, which substantially fills the remainder of the trench to a level corresponding generally to the top surface of the adjacent soil whereby water is dispensed by capillary action and hydrostatic head to the plant growing soil along the sides of the trench, and irrigation is confined substantially to a predetermined pattern in the subsurface soil, facilitating the seeking of the best moisture level by the roots of the vegetation being irrigated, thereby inherently providing for the maximum benefit to the irrigated plants while minimizing the loss of water by evaporation, and also minimizing the supply of moisture to the further removed soil where it is undesirable to have vegetation growth.

Further objects and advantages of this invention will become apparent from the following description referring to the accompanying drawings, and the features of novelty which characterize this invention will be pointed out with particularity in the claims appended to and forming a part of this specification.

It is well-known that inrtoducing water beneath the surface of the soil results in efficient water usage, provided that the moisture is well directed to the plant roots and that drainage losses below root level are not excessive. In this way less water is required because of the minimizing of surface evaporation directly to the atmosphere before the water has an opportunity to penetrate the soil. A number of different systems have been proposed for subterranean irrigation. In most of these systems the water is allowed to seep into the soil from a distributing conduit, and the most successful has been through perforated conduits, generally known as seep hoses. With this type of system an attendant must give fairly close attention to the irrigation while the water is being supplied to the hose in order to supply the proper moisture content. Certain types of automatic controls have been proposed but these have been rather complicated and also require a considerable amount of equipment so that the system becomes quite expensive if an efficient control is desired.

A more regulated type of subterranean water distribution has been proposed wherein the distributing conduits are provided with intermittent outlets which permit the discharge of the water into the soil at spaced points through limited supply openings utilizing a porous material to restrict the flow of water into the adjacent soil. These systems also have been relatively expensive and, therefore, have not met with great success, in addition to the fact that the spaced water outlets along the length of the conduits do not provide a continuous uniform moisture supply.

SUMMARY OF INVENTION

In accordance with the present invention, a subterranean irrigation system is provided which utilizes the proven desirable distribution features and capillary flow of water from the water distributing conduits to the adjacent soil and in addition provides for thus distributing the water uniformly throughout the length of the distributing conduits by an improved arrangement of the capillary-feed material and an improved and simplified inherent self-regulation of the water supply. In addition, the present irrigation system provides an arrangement whereby a selectable predetermined moisture pattern can be established in the soil adjacent to the distributing conduits which provides for the progressive gradation of moisture in the soil diminishing substantially inversely with the distance away from the water distributing means and extending downwardly progressively outwardly into the soil directly with the depth from the top of the capillary system in contact with the adjacent soil. This has a marked advantage over other systems in that it provides for a substantially continuously uniform moisture pattern along the entire length of the moisture supply conduit and enables the roots of the plants to seek out the moisture level most suited for the growth of the type plants being irrigated. This is further enhanced by the nature of the moisture pattern in that it provides for the highest desired degree of moisture saturation of the soil throughout a predetermined area and a gradually decreasing moisture content away from this maximum moisture area. The degree to which the soil is saturated and the extent to which the pattern penetrates the adjacent soil also is inherently selectable by providing for a predetermined free water level in capillary material, which is arranged over the water distributing conduits and which functions to provide for a relatively large free-water supply to the capillary material, so that it can be evenly distributed throughout the length of the irrigation system. In addition, the predetermined desired pattern is assured by providing an impervious sheath which extends under the water distributing conduit and around the sides thereof and upwardly to a height intermediate the top of the water distributing conduit and the top surface of adjacent soil and is at least coextensive with the maximum desired height of the free-water level. In most instances, it will be found that the system operates most efficiently by placing the water conduit and the capillary material in a trench which is filled with the capillary material to about the same level as the top surface of the adjacent soil. This has the advantage of providing for the distribution of moisture into the adjacent soil, both by the capillary transfer of the moisture from the capillary material to the soil through the contact established therebetween, and also by the hydrostatic head near the top of the trench, which aids in causing the water to penetrate downwardly into the adjacent soil. Various additional advantages and structural details which provide such advantages and special features which may be found more desirable for various different soil and vegetation conditions are illustrated in the drawings, which are described in detail in connection with systems which incorporate the foregoing basic features. The same parts bear the same reference numerals in all figures so as more easily to correlate the different views and features of the invention as illustrated in the drawings.

Figure 1:
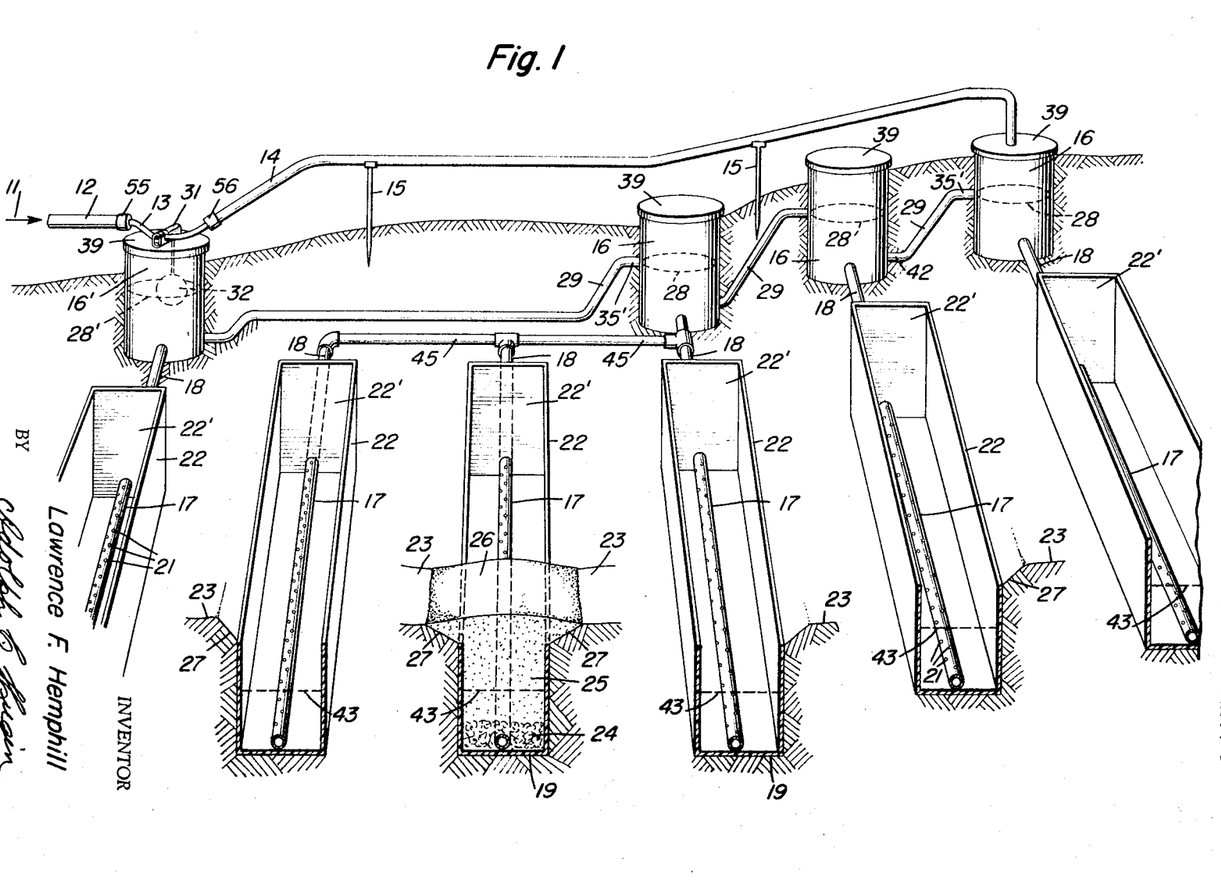
FIG. 1 is a schematic perspective view with various sectional illustrations of an irrigation system utilizing an embodiment of the present invention and showing the general features of the present invention.
Figure 2:
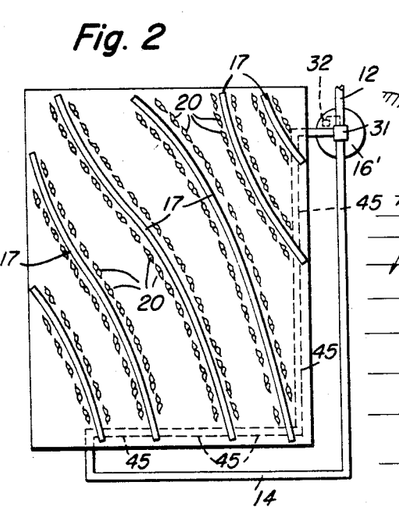
FIG. 2 is a plan view of a vegetation growing area provided with an irrigation system embodying the present invention.

An irrigation system in accordance with the present invention is particularly useful and efficient in that it will provide the same desirable uniform moisture distribution regardless of the contours of the land with which it is used without causing flooding or uneven distribution of moisture or fertilizing material. It also has the same desirable even distribution of moisture whether used for a small garden plot, edging, or row planting, or for relatively extensive crop or orchard irrigation. In addition, it has the advantage of providing for adjustably selecting the moisture pattern to provide for the most effective irrigation, and provides for varying the pattern in different parts of the system as desired without requiring an overall system control adjustment. FIGS. 1 and 2 illustrate systems in which the distributing conduits may be arranged along different contour lines and also illustrates the manner in which the conduits may be arranged and connected where the soil is relatively even and flat.

As shown in FIG. 1, a subterranean irrigation system is provided to which water is supplied from any suitable source, indicated generally by the arrow 11. This water supply is suitably connected to the system by a supply conduit 12 from which it passes through a relatively smaller gauge tube or conduit 13, which provides for limiting the supply of water to the system, as all of the water used must pass through the relatively small water passage through this tube. In this manner, if there is a malfunction of any part of the control of the irrigation system, the amount of water which will be supplied to the system through the tube 13 before detection of the malfunction will be limited to a relatively small quantity, thereby minimizing the possibility of deleterious flooding of any substantial part of the system. The small gauge tube 13 is connected to a system supply conduit 14, which may be any suitable size pipe and may be laid underground, on the surface of the ground, or supported in an elevated position by suitable supports 15, as shown in FIG. 1. This piping conducts the water from the small tube 13 to the highest point in the irrigation system and, in this embodiment, enters into a header 16.

In order to provide the desired supply of water to the soil, which is to be irrigated, the water is adapted to pass from the receiving receptacle, which in FIG. 1 is the header 16, into a subterranean water distributing conduit extending substantially level below the surface of the soil. This distributing conduit may comprise any suitable water conducting passageway and, in this embodiment, is illustrated as a perforated tubular member 17, which may be a plastic hose connected in any suitable manner, as by an imperforate tubular connection 18, to the header 16.

Figure 3:
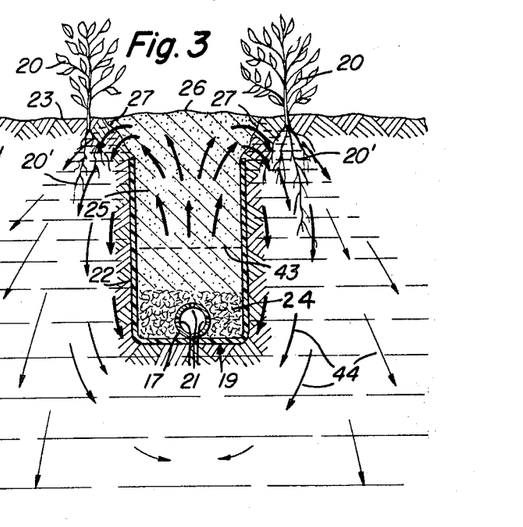
FIG. 3 is a vertical sectional view through an irrigation system trench embodying the present invention and of the adjacent soil, illustrating the general method whereby the regulated moisture pattern and degree of moisture content is provided by the present improved irrigation system.

In order to obtain a predetermined selectable moisture distribution pattern in the soil surrounding the water distributing conduit 17, this conduit preferably is placed in a laterally extending trench 19, FIG. 3. In the case of borders along walkways, roadways, or other border plantings, a single trench, such as that shown in a cross section in FIG. 3, is sufficient to supply the irrigation requirements for most practicable purposes. When the planting area is more extensive and covers a garden plot, and even for field crop or orchard purposes where it extends over a relatively large area, a plurality of such trenches and water distributing conduits are used, as shown in FIGS. 1 and 2. FIG. 1 shows such a system in perspective with most of the ground around the trenches removed simply to illustrate the connections more clearly. These conduits preferably extend laterally from the water supply conduit and, in accordance with the present invention, may be used on any type of land profile. The primary requirement for maintaining the desired uniformity of the moisure pattern and moisture distribution throughout the area under irrigation is that the water distributing conduit should extend substantially along a fixed level, that is, along a contour line of the land. Different conduits may, of course, extend along different contour lines, provided any one conduit is maintained substantially level.

The most practical manner of installing the irrigation system is to dig trenches, each of which has a substantially level bottom surface, that is, the bottom of each of the trenches should extend substantially along a single line so that the water distributing conduit members of the irrigation system can simply extend along the bottoms of these trenches. Thus, if the land is substantially level, all of the trenches may be dug to substantially the same depth, with the bottoms of all of the trenches also at substantially the same level. Where the contour lines do not extend parallel to each other, as along a slope or terraced hillside, the distributing water conduits, and consequently the trenches, are made to extend laterally along fixed contour lines so that the distances between trenches may not always be uniform. Where this spacing is not uniform, the plantings should be made to conform to the layout of the irrigation water distributing conduits, that is, to conform to the manner in which the trenches extend, so that the plants will receive the maximum benefits from the irrigation.

The lateral water distributing conduits may comprise any suitable structure which provides for the free flow of water throughout each conduit, and, since water inherently seeks its own level, it is desirable that the conduits 17 extend substantially at a constant level in order to provide a substantially uniform distribution of water throughout the length of each conduit. As shown in FIG. 1 and in greater detail in FIG. 3, the illustrated conduit may be in the form of a tube 17 having a number of longitudinally and circumferentially spaced perforations 21 through which the water can readily pass out of the perforated conduit. In order to prevent direct seepage of water into the adjacent soil and in order to promote a regulated moisture distribution pattern, an imperforate liner or sheath 22 is arranged over the bottom, ends, and sides of the trench 19. It extends under the distributing conduit 17 and over the ends and sides of the trench to a height intermediate of the top of conduit 17 and the top surface 23 of the adjacent soil. The exact height to this imperforate liner or water barrier will be explained later with reference to the attainment of the desired moisture pattern.

In order to obtain the desired distribution of moisture into the soil adjacent to the trench 19 according to desired regulated manner, a capillary-feed material or medium is placed over the water distributing conduit 17 and fills the remainder of the trench 19 to a height substantially coextensive with the top surface 23 of the adjacent soil on both sides of the trench. This capillary-feed material must be of a nature so as to transmit water by capillary action and also be capable of readily being saturated with water to a predetermined height, which can be maintained automatically according to the present invention in order to assure the maintenance of a uniform, continuous moisture supply to the soil under irrigation. This is a very important aspect of the present invention in that it permits the vegetation, such as the plants 20, under irrigation to grow roots 20', FIG. 3, seeking the moisture best suited to the individual plant requirements.

In order to assure the maximum useful life of the distribution conduits 17, it is desirable to minimize the entrance thereinto of extraneous solid materials which might tend to pass into the conduits through the perforations 21 and to settle therein, eventually blocking or materially restricting the free flow of water through the conduits. This can readily be accomplished by utilizing a nongranular or fibrous capillary-feed material 24 over the perforated distributing conduits. This fibrous capillary-feed material may comprise any suitable medium, such as rock wool, mineral wool, or the like, and should extend to a sufficient thickness over the distributing conduit 17 so that any tendency of solid material to pass downwardly towards the conduit perforations 21 will be effectively filtered or screened out before reaching the conduit. The remainder of the trench 19 preferably is filled with finely granular water capillary-feed material 25, such as sand or suitable soil, and this preferably is exposed to the atmosphere at the top 26 of the trench. The main reason for not covering this granular capillary material with vegetation growing soil is because some soils have a tendency to go into suspension in the irrigation moisture and inherently to travel downwardly through the moisture and eventually to clog the capillary-feed interstices and even to percolate into the distributing conduit. This type of suspension and sedimentation does not occur in normally clean beach or washed sand, so that the use of such sand as the granular capillary-feed material enhances the useful life of the system.

As shown more clearly in the sectional view in FIG. 3, it has been found desirable in some instances to flare the upper edges 27 on both sides of the top of a trench 19 above the imperforate liner 22, so that the top of the trench is wider than the main body thereof and the capillary-feed material extends over the soil adjacent to both upper edges of the trench. This flaring of the upper edges has two main beneficial effects. If the soil is of a type which tends to form silt, such as clay, which migrates downwardly into the capillary feed material, these flared edges inhibit such silt movement which might, in time, diminish and impede the capillary feed of water through the capillary material. Secondly, if the capillarity of the soil is less than that of the capillary-feed material in the trench, such flared edges increase the area of the interface of the soil and the capillary-feed material and, for a given free-water level, increases the moisture transfer for a given vertical depth of the interface. Such a flare is not needed where the soil capillarity is as good as that of the capillary-feed material in the trench, and in fact, such soil may be used directly as the capillary-feed material. It has been found in practice that an effective depth for these flared edges; that is, of distance from the upper edges of the imperforate liner to the top surface of the trench, is generally very effective between 2 and 3 inches, especially for garden plants. This has been found to be practical for irrigation of vegetation varying from relatively small plants to fairly large vegetation. The flared edges 27 also have been found to provide an improved intimate moisture transmitting contact between the capillary-feed material 25 and the adjacent vegetation growing soil.

A basic aspect of the present invention requires that the free-water level in the trench shall not extend as high as the top of the imperforate liner, as this would tend to cause direct seepage of the water from the trench into the adjacent soil and would destroy the desired moisture pattern. Thus, it is necessary that the top of the imperforate barrier be at least as high as the maximum desired free-water level in the trench. This free-water level is the level to which the capillary-feed medium is fully saturated. As shown in FIG. 3, when irrigation water is supplied to the perforated distributing conduit 17 and passes outwardly through the perforations 21 into the capillary material 24 and thence upwardly by capillary or molecular attraction, it will tend to saturate the capillary-feed material to a height corresponding to the head of water in the main water supply to the individual conduits. This is illustrated in FIG. 1, wherein the main water supply to the conduits 17 is in the form of headers 16 to which the irrigation water is supplied from the source 11. As shown in this figure, the water will collect in a header 16 to a height indicated by the dotted line 28, after which the water will drain out of the header 16 through a drain pipe 29 into the next lower header of the system. The header 16', which is the lowest in the system, can be considered as a sump which is not provided with a drain pipe 29, but is provided with a float valve 31 of any suitable type. This valve includes an operating float 32 which, as in any conventional float valve, is adapted to ride on the water in the header 16'. This float 32 and its associated valve 31 preferably are adjustable, and the valve 31 is connected so that it will open to permit the passage of water into the system from the source 11 when the level of the water in the sump 16' falls below a predetermined head and will close to shut off the supply water into the system when the level 28' in the sump 16' reaches a predetermined maximum desired value. In this way, the head of water in all of the headers 16 of the system is automatically maintained substantially constant. This head of water may be predetermined for any specific installation and made permanent as shown in FIG. 1 or may be made adjustable in any suitable manner.

Figure 11:
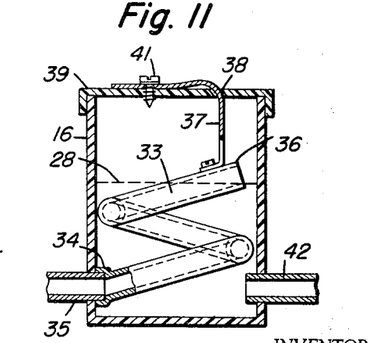
FIG. 11 is a vertical partial sectional view through a header for use with an irrigation system incorporating the present invention, wherein the header is provided with means for readily adjusting the predetermined free-water level of a trench supplied with water by the illustrated header.

Various adjusting means may be used, and details of such an adjustable structure are shown in FIG. 11. As there shown, an adjustable drain may conveniently be provided so as to allow for adjusting the level at which the head 28 is maintained. It can be made as a short coil 33 of corrosion resisting tubular material arranged within a header 16, with one end 34 to the coil connected to an end 35 of a drain pipe, preferably fitted into the lower part of the header 16 and having the other end 36 of the tubular member open and suspended in the header 16, as by a suitable flexible strap 37 which passes through an aperture 38 in the cover 39 of the header. The flexible strap 37 is secured in any suitable manner to the tubular drain member 33 adjacent to its upper end 36 and is fastened to the cover 39 by any suitable means, such as a screw 41 which clamps it in fixed position so as to determine the height of the open upper end 36 of the tubular member 33. This height fixes the head of water 28 which will inherently collect in the header 16, as any tendency for the water to exceed this height will result in drainage of the water through the tubular member 33 and out through the drain to the next lower header. If desired, the strap 37 can be calibrated and a pointer or index mark placed on the cover 39, so that the height of the open end 36 of the drain coil can be easily determined by references to the calibration on the strap. It should be noted that in such an arrangement, it is essential that the connection of the drain 35 to the header should preferably be at least as high as the inlet connection 42 to the next lower header. This is not absolutely essential, as the head 28 will be sufficient to cause the water to flow into the next lower header, but is desirable in to order to minimize the possibility of the collection of sediment in the interconnection between headers. With such an adjustable drain structure it is possible individually to regulate the predetermined head of water which is to be maintained in each supply header, so that the water pattern provided by the trenches connected to each header can be varied in accordance with the needs of the vegetation to which the irrigation is supplied by the separate headers.

The head of water 28, which is maintained in the headers 16, provides the pressure on the water which is supplied to the lateral distributing conduits 17, and this pressure causes the water to pass outwardly from the perforated conduits 17 into the capillary-feed material 24 and thence into the capillary-feed material 25, tending to saturate this capillary material to a free-water height 43. This free-water height 43 is the same level to which water would rise in the trench 19 if there were no capillary material therein, so that it has the same effect upon the remainder of the capillary material above this free-water height as if the trench were filled with water of this height and this water were then fed into the capillary material in the trench above this level. Thus, the head 28 to which the water is maintained in the header 16 determines the free-water height in the lateral distributing trench and determines the point from which the water must travel through the capillary-feed material by capillary attraction. This free-water level, in conjunction with soil saturation at the interface 27, effectively inherently regulates the rate at which the moisture will travel upwardly through the capillary material 25 and be fed into the adjacent vegetation growing soil.

It has been found that in this type of irrigation system construction, the moisture will pass from the irrigating trench into the adjacent soil on both sides of the trench in a pattern generally as shown in FIG. 3. In this figure, the relative saturation of the soil is indicated by the relative shades of arrows 44 which indicate the migration of water in this pattern. As will be seen, the moisture content assumes a very regular pattern which extends generally roughly 45° outwardly from the top of both sides of the trench, depending on the capillarity of the soil, such that the moisture content of the soil fed by the system is inherently regulated to substantially fixed gradations, evenly progressively diminishing away from the trench and into a progressively wider section downwardly from the top of the trench. Thus, the moisture saturation is greatest adjacent to the trench and diminishes substantially inversely with the distance away from the trench and also extends downwardly progressively outwardly from the trench directly with the depth from the top of the trench.

This pattern can be varied in its extent of penetration of the soil away from the trench by two major factors. These are the capillary-feed of the moisture to the soil adjacent to the trench and the hydrostatic head on the moisture. The capillary-feed of moisture into the soil is dependent to a large degree upon the free-water height 43 which is maintained in the trench. Thus, a variation in the free-water height can be used directly to control the degree of saturation and the extent to which the moisture pattern will penetrate into the surrounding soil. As shown in FIG. 3, vegetation 20 which is irrigated by the present system is free to grow roots 20' into the soil to seek the best moisture level for the promotion of the growth of the vegetation being irrigated. It is well-known that certain types of plants will not survive if the roots are continuously flooded with water, whereas other types of vegetation require almost a continuous supply of water. Since the growing soil adjacent to the present type of irrigation trenches is reasonably highly saturated to a substantial depth and may vary to substantially dry soil generally midway between the trenches, roots are free to grow into the best moisture content for the growth of the plants. This produces an additional very beneficial and helpful result in row cultivation of plants in that the soil intermediate the irrigation trenches may become substantially dried out during the dryer, warm summer months, thereby minimizing weeds between the irrigated plantings, while maintaining relatively moist soil along the rows of irrigated plants, thus also facilitating the weeding of these plants.

In an irrigation system wherein the land is substantially level, so that the irrigation trenches extending along contour lines will all be at about the same level, it is not necessary to provide a header for each lateral water distributing conduit 17. All of these conduits may be suitably interconnected to a single header, as shown by the interconnecting supply pipes 45 which connect all of the tubular connections 18 of the three intermediate trenches, FIG. 1, to a single header 16, shown as the third header from the right in this figure. Thus, all three of these trenches will be supplied with water, and the free-water level for all of them will be maintained at the same height, by the single header to which they are connected.

FIG. 2 represents a plan view of a system on a rolling or slightly hilly terrain, and shows the ready adaptibility of the system to such land contours. The headers, not shown, are like those of FIG. 1 or FIG. 5.

Figures 4, 5, 6:
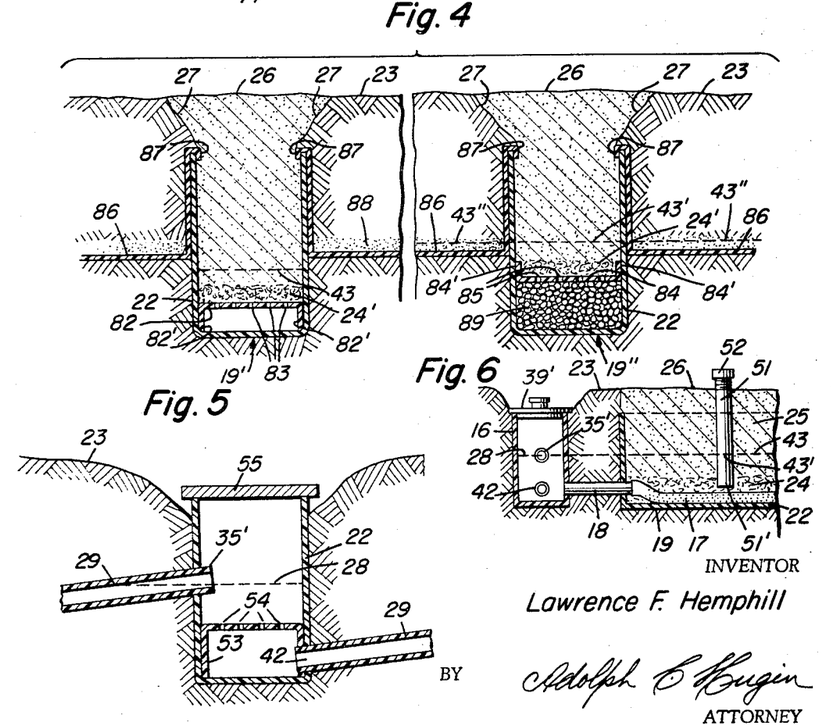
FIG. 4 is a sectional view, similar to FIG. 3, illustrating variations in trench and water supply structures, particularly adaptable for use where a new vegetation growing layer of soil, such as top soil or a new lawn, is to be utilized with the system, and especially where it is desirable to have moisture supplied to all of the soil between adjacent irrigation trenches.
FIG. 5 is a vertical sectional view through a trench header which is formed directly by a part of a trench and is a variation of the type of headers shown in FIG. 1.
FIG. 6 is a partial longitudinal sectional view through a header and trench of a type similar to that shown in FIG. 1, specifically illustrating the free water level control aspect of the present invention, and of an arrangement for checking this free water level in an irrigation system.

Reference to FIG. 6 will show the direct relationship between the head of water 28 in a header 16 and the corresponding free-water level or height 43 in a connected lateral trench. As shown in this figure, the water is supplied into the header 16 through an inlet connection 42 and passes from the header into the perforated distributing conduit 17 through the tubular connection 18, which extends from header 16 into the trench 19. The level of water will rise in the header 16 until it reaches the upper end 35' of a drain 29 into which it will then drain, thus, inherently maintaining the head to cause water to pass upwardly in the trench 19 to the free-water level 43 and to maintain the lower portion of the trench saturated. The water in the trench will then pass upwardly by capillary action, through the capillary material 25, as has already been explained with reference to FIGS. 1 and 3.

In this figure, the header 16 is shown as completely below the surface 23 of the soil being irrigated and this may be found desirable in certain areas for esthetic reasons, or even for practical reasons where it might interfere with the ready passage of equipment over the land, if it were to extend above the surface of the soil. In all such instances, it is highly desirable to provide a removable cover 39' in order to facilitate an inspection of the header 16 and also to minimize the entrance of foreign materials into the header, including living creatures such as insects, frogs, or similar reptiles which may breed in water.

It may also be desirable to be able to check the proper operation of the system by determining if the free-water level is being maintained in the individual trenches. This will provide a quick check to indicate any malfunction in the system, as in most instances such a malfunction will result in a loss or lower than normal free-water level, or will result in a flooding of a trench by an excessively high free-water level. A convenient way quickly to determine the free-water level in an individual trench is illustrated in FIG. 6. This includes a dip-stick free-water height indicator, which comprises a standpipe 51, with a finely perforate lower end 51', extending into the trench 19 to a depth below the desired free-water height, and preferably to a point closely adjacent to the bottom of the trench. The reason for making the lower end 51' of the standpipe finely perforate is in order to permit the free water in the trench 19 to pass freely into the standpipe 51, so that it will rise in the pipe to a level 43' corresponding to the free-water level 43 in the trench. If the perforations in the standpipe are too large, there will be a tendency for foreign material, such as the granular capillary-feed material to pass into the pipe with the water and to settle therein, eventually clogging the pipe and making it ineffective for its intended purpose. This standpipe 51 should be covered with a suitable cover 52 to prevent the entrance of foreign matter into the top of the pipe. When it is desired to determine the height of free water in the trench 19 it is simply necessary to remove the cover 52 and to insert a calibrated dip-stick into the standpipe, so that the height of water in the pipe can be readily determined simply by reading the measurement on the dip-stick, which is indicated by the height to which the stick was wet when it was inserted into the standpipe. This type of dip-stick free-water height indicator may be used with any embodiment of the present invention, and is shown in connection with the separate trench and header structure simply for illustrative purposes.

In some instances, it may be found desirable to utilize the maximum amount of space for growing purposes and, therefore, it may be desirable to combine the header water supply feature with the lateral moisture distributing trench feature. An embodiment illustrating this type of combined structure is shown in FIG. 5. This also provides a more economical construction than a system having separate headers.

In this embodiment of the present invention, a laterally extending trench is formed along a contour line in the same manner as in the previously described systems, and an imperforated liner or sheath 22 is arranged in the trench over the bottom and sides thereof in the manner as previously described. The laterally extending water distributing perforate member may comprise a tubular conduit, such as that shown in FIGS. 1, 3, and 6, or may be formed simply by arranging a perforate self-supporting barrier across the lower part of the trench extending between the sides of the liner 22 and spaced upwardly from the bottom of the trench. This conduit-forming barrier may conveniently be in the form of a U-shaped channel 53, which is inverted so that the legs of the channel support the base of the channel spaced upwardly from the bottom part of the liner 22. A plurality of longitudinally and laterally spaced perforations 54 extend through the base of the channel 53 and provide for the distributed passage of water from the conduit formed by the channel 53 into the space above this conduit. In order to provide for a desired capillary-feed of moisture into the adjacent soil, the channel is filled with suitable capillary material above the channel section 53 in the same manner as shown in detail in FIG. 3. If desired, a layer of non-granular capillary material, such as that shown at 24 in FIG. 3, may be placed over the perforations of the channel member 53, so as to minimize the passage of foreign materials into the water distributing conduit formed by this channel member.

As shown in FIG. 5, the end of the channel adjacent to the water supply is left empty and is not filled with capillary-feed material so as not to block the drain pipe 29. Water is adapted to be fed into this end of the channel through a conduit, such as a drain pipe 29, from which it passes into the channel from the lower end 42 of the drain pipe 29, which preferably is connected directly into the conduit space formed by the channel 53. This water then can pass laterally directly into the distributing conduit throughout the length of the trench and also upwardly through the perforations 54 into the unfilled end of the trench in which it will rise to a head, indicated by the dotted line 28, which corresponds to substantially the lower edge of the upper end 35' of a drain 29. Water will thus be automatically drained from the header end of the trench when it reaches the predetermined desired free-water level head 28. If desired, an adjustable drainage connection, such as that illustrated in FIG. 11, may also be provided in this embodiment of the invention. For practical reasons, it is desirable to place a cover 55 over the unfilled open end of the trench so as to minimize the entrance thereinto of foreign matter. In every instance, the trench liner 22 is formed with closed ends 22', as shown in FIG. 1. This is necessary in order to assure the desired capillary feed into the adjacent soil and to prevent flooding or undesirable seepage of water out of the ends of the trenches.

Figure 7:
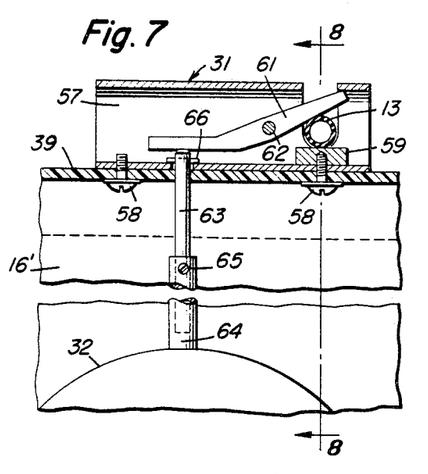
FIG. 7 is a sectional view through a part of a sump and a main water supply control valve for automatically regulating the supply of water to an irrigation system incorporating the present invention.
Figure 8:
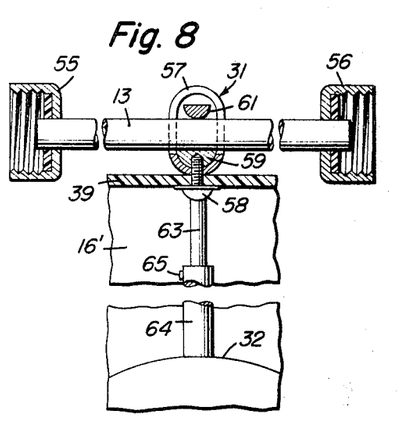
FIG. 8 is a partial sectional view, taken along line 8—8 of FIG. 7, further illustrating details of the float valve control shown in these two figures.

Any suitable float valve 31 may be utilized, although in most instances it will be desirable to provide a restricted passageway in the main water supply as previously explained, and this may conveniently be incorporated in the float valve. FIGS. 7 and 8 illustrate a simple float valve control in which the main water supply passes from the supply pipe 12 into the restricted tube 13, to which it is connected by a suitable cap 55, and passes from the restricted tube 13 to the main pipe 14 by being connected thereto by any suitable cap 56. The restricted tube 13 preferably is formed of a readily deformable noncorrosive material, such as a suitable plastic which can be readily compressed by the float valve mechanism to control the water flow. In this water control, the restricted tube 13 is supported in any suitable manner and is shown passing through a shield 57 which is secured in any suitable manner, as by screws 58, to the cover 39 of the sump header 16'. In passing through the shield 57 the tube is supported on an anvil 59, which may be readily secured in position by one of the screws 58 and is rigidly fitted into a complementary subjacent surface of the shield 57. The float valve mechanism utilizes a simple pivoted lever 61 mounted on a pivot pin 62, supported on the sides of the shield 57, for compressing the tube 13 to regulate the water flow in the system. One of the lever arms is arranged in engagement with the upper surface of the tube 13 directly above the anvil 59, while the opposite arm of the lever 61 is engaged by the end of a suitable push rod 63 secured to the float 32. The connection of the push rod to the float 32 may comprise any suitable fastening member, such as a socket 64, rigidly secured to the float 32 and fitted over the end of the push rod 63 to which it is adjustably secured, as by a set screw 65. The upper end of the push rod 63 preferably has a stop pin 66 therethrough to prevent the push rod from falling completely through the cover 39, if the level of water in the sump header 16' falls to a height insufficient to support the float 32 in a position with the end of the push rod 63 extending upwardly through the cover 39.

The height at which the free water is to be maintained can be regulated simply by adjusting the position of the push rod 63 in the socket 64. The height at which the float 32 will raise the push rod 63, and consequently turn the lever 61 in a direction to lower the lever arm in engagement with the tube 13, will determine the effective free-water level in the distributing trenches connected to the initial header of a system, as when the float 32 rises above this position, the lever 61 will compress the part of the tube 13 upon the anvil 59 so as to diminish or cut off the water supply. In some instances, this will not result in an intermittent opening and closing of the water supply, but may result in a simple decrease in the size of the passageway through the tube 13 over the anvil 59 to a point at which the water passing through the tube equals the amount of water which is being distributed by the irrigation system into the soil, and this flow will be maintained substantially constant as long as the moisture requirements of the soil remain the same. Should the soil receive natural moisture, as during a rain, the capillary feed from the trench inherently will be reduced and, therefore, the water in the headers will not be distributed as rapidly as during a rainless or arid period. Thus, the water in the sump header 16' will be kept at a fairly high level and the passageway opening through the tube 13 will be reduced so as to maintain the water supply to the irrigation system just sufficient for the requirements of the soil. In this manner, the system automatically maintains a substantially constant moisture supply to the soil being irrigated. The reverse action automatically occurs during hot, dry weather when the moisture passes more rapidly from the capillary-feed material into the soil, so that the water head in the headers falls more rapidly and the drainage returning into the sump header 16' is reduced. This causes a consequent lowering of the float 32 and a release of the pressure by the lever 61 on the tube 13, thus permitting the tube 13 to expand to provide a larger water passage therethrough.

Figure 9:
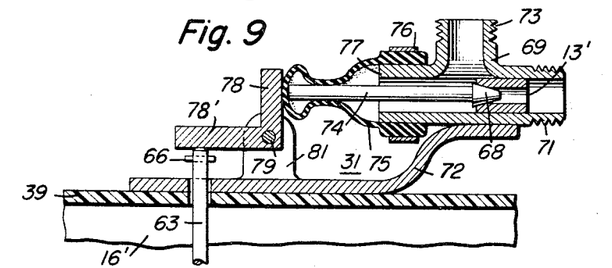
FIG. 9 is a partial sectional view illustrating details of another type of float controlled valve of the needle type for use in connection with the main sump and water supply of an irrigation system incorporating the present invention.

FIG. 9 illustrates another type of float valve in which the float mechanism can be essentially the same as the one shown in FIGS. 7 and 8 in which the push rod 63 is adapted to operate the valve proper. In this construction the float valve is shown as a needle valve 68 adapted to be seated on a suitable valve seat 13', which forms the restricted tubular passage for the supply of water to the main supply pipe 14. This needle float valve includes a main housing 69 in the form of a T, to one threaded arm 73 of which the system supply conduit 14 is connected. This T 69 is supported in any suitable manner, as by a bracket 72, rigidly secured to the cover 39. The source of water supply is adapted to be connected to the T 69 in any suitable manner, as by threated connection of the supply conduit 12 with the threated leg 71 of the T. The needle valve 68 is provided with a valve stem 74, which extends from the valve 68 and is slideably supported by a deformable sealing member, such as a nipple 75, which may be secured in any suitable manner, as by a clamping strap 76, to the end 77 of the T opposite the threated end 71. The end of a nipple around the end of the valve stem 74 is arranged in engagement with an arm 78 of a crank which is pivotally mounted by a pin 79 on ears 81 extending upwardly from the bracket 72. The other arm 78' of the crank is adapted to be engaged by the upper end of the float push road 63, so that when the height of water in the sump header 16' reaches a predetermined desired head, the push rod 63 is raised by the float 32 and turns the crank so that the crank arm 78 pushes against the end of the valve stem 74 tending to close the valve 68 on its seat 13'. As in the float valve structure shown in FIGS. 7 and 8, the head of water in the lowest and consequently the highest headers may be regulated simply by adjusting the position of the push rod 63 relative to the float 32, thereby regulating the head of water at which the push rod 63 is effective to close the valve 68. Various other types of similar float valves can be utilized in order automatically to regulate the operation of the irrigation system, and, in most instances, it will be found useful to incorporate a restricted water passageway in the control float valve, so as to provide a freeze-safe and flooh control element in the system, as has been previously explained.

Various modifications of the structural details of irrigation systems involving the present invention may readily be made and may be found particularly useful for special purposes. FIG. 4 illustrates several of these modifications and shows two laterally spaced trenches which are provided with different lateral water distributing conduits supplied with heads of water which are shown different for the two trenches in order to illustrate different operations of the irrigation system and are also shown as supplying moisture to soil with and without an auxiliary capilliary-feed layer intermediate the trenches.

In this figure both trenches are adapted to be dug in the same general manner as the previously described trenches and are preferably formed with flared outer edges 27, as in the FIG. 1 and 3 systems. In both of these trenches an imperforate liner 22 is arranged over the bottom of the trench and over both sides to a point roughly two to three inches below the surface of the ground, in the same manner as has been explained with reference to FIGS. 1 and 3. The ends of the trenches also are closed by the imperforate liner 22 in the same manner as shown in FIG. 1 at 22'.

In the trench 19', shown at the left in this figure, the lateral water conduit is formed by a barrier 82 which extends transversely across the trench between the sides of the liner 22 and longitudinally the full length of the trench. In the illustrated construction, this barrier is formed of a self-supporting rigid material and is illustrated as being a channel section member with the flanges 82' thereof extending downwardly and resting on the bottom of the liner thereby providing a lateral water distributing conduit similar to that of FIG. 5. Generally it is preferable if this barrier 82 be made of a rigid, non-corrosive, decay-resistant material, so that the constant immersion in water will have a minimal deleterious effect thereon. As shown in this figure a plurality of transversely and laterally spaced perforations 83 extend through the barrier 82, so as to provide for a distributed passage of water from the conduit formed between the barrier 82 and the bottom of the liner 22.

Preferably a layer of non-granular capillary material 24', of the same type as that shown in FIG. 3, is arranged over the barrier 82 so as to facilitate the passage of water outwardly from the conduit through the perforations 83, while minimizing the passage of other materials downwardly through the perforations 83 into the lateral water conduit. The remainder of the trench above the nongranular capillary material 24' is filled with capillary-feed material 25, which preferably is finely granular, the same as has been previously described with reference to the other constructions, and also extends upwardly to a top surface 26 substantially coextensive with the top surface 23 of the adjacent vegetation growing soil. It is preferable that the soil should not extend over this capillary material, as if too much soil intermingles with the capillary material 25, it may tend to fill up the intergranular interstices and hinder the normal capillary flow of moisture from the irrigation trenches into the adjacent soil.

In the right-hand trench 19'', shown in FIG. 4, a barrier 84 is shown which extends across the trench spaced upwardly from the bottom, so as to provide a water conducting space between the barrier and the bottom of the trench. In this instance, the barrier is shown as a nonself-supporting member, and the water conducting conduit space between the barrier 84 and the liner covering the bottom of the trench is filled with relatively smooth pebbles or clean gravel 89. This filling provides for a free passage of water longitudinally through the conduit in the spaces between the pebbles, and the barrier 84 is formed with a plurality of transversely longitudinally spaced perforations 85 which provide for a distributed passage of water from the conduit into the trench above the conduit. In contrast to the self-supporting barrier 82, which preferably is arranged with the channel section flanges 82' extending downwardly so as to support the barrier in its upwardly spaced relation to the bottom of the trench, the barrier 84 preferably is formed as a channel section member with the pebbles 89 supporting the barrier and having the channel section flanges 84' in this instance preferably extending upwardly. These flanges will tend to seal the barrier against the adjacent sides of the liner 22, so as to prevent any tendency for clogging materials to pass downwardly between the sides of the barrier flanges and the trench liner. As in the other constructions, it is preferable to arrange a layer of non-granular, preferably fibrous, capillary-feed material 24' over the perforate barrier 84. The function of this fibrous capillary-feed material is the same in this case as in the other embodiments of this invention. The remainder of the trench is filled with capillary-feed material 25, in the same manner as the other trenches which have been previously described.

Water is adapted to be supplied to the lateral water distributing conduits formed by the channel barriers 82 and 84 from any suitable main supply source, such as those illustrated in FIGS. 1, 2, 5, 6, and 11. The arrangements shown in FIG. 4 are especially useful in connection with relatively shallow plantings or vegetable growth, such as lawns, and especially where a new lawn or a layer of top soil is to be placed over a preexisting lawn or other soil. In this system, a water barrier mat 86 of imperforate material is placed over the surface of the old lawn or ground which is to be covered with top soil or sod. This mat may comprise any suitable flexible plastic sheet which is arranged over the surface of the ground and extends upwardly over the sides of the trench liner 22, preferably with an edge 87 turned over the upper edge of each side of the trench liner. This will tend to secure the mat in position and also assures a maximum efficiency in the passage of moisture from the capillary material 25 into the soil above the mat 86 as it prevents leakage of moisture between the trench liner sides and the upwardly extending sides of the mats 86. These mats extend continuously between adjacent trenches, and the break shown in FIG. 4 is simply made in order to permit a larger illustration of the details of the trench construction, there actually being no break in a mat which thus extends between trenches. Also, in a usual construction of this type system, all of the trenches would be made the same, and the different structures shown in the two trenches of FIG. 4 are merely illustrative of different types of construction which can be utilized in carrying out this invention.

In addition, it will be noted that the soil on the outer sides of both of the trenches in FIG. 4 is simply the usual type soil which would be used as top soil or as sod, while the fill directly over the mat 86 between the two trenches is shown as being a capillary-feed material, preferably of the granular type, such as sand. In practice a uniform fill would be used for any given installation, and the different fills on opposite sides of the trenches in FIG. 4 are shown merely to illustrate different types of fills which can be used in carrying out these embodiments of the present invention.

When the soil above the barrier mat 86 is substantially uniform from the top of the mat to the surface exposed to the atmosphere, the moisture will migrate in essentially the same way as that shown in FIG. 3 adjacent to a trench, and the moisture will pass downwardly through the soil to the top of the mat 86. Normally the capillarity of a soil will cause the moisture to pass transversely through the soil away from the trench from which it has been supplied, and, since the soil above the mat will tend to be dryer directly in proportion to its distance laterally away from the trench, the moisture, which passes along the soil near the top of the mat 86, will tend to return upwardly into this dryer soil due to capillary or molecular attraction. In order to increase the more uniform distribution of moisture through the soil between trenches and also in order to minimize the number of trenches required adequately to irrigate the relatively shallow top soil or sod, a layer of capillary-feed material 88 placed directly over a mat 86, even to a relatively shallow depth of an inch or two, will greatly facilitate the transmittal of moisture laterally away from the sides of the trenches, and thus facilitate its distribution over a wider area between the trenches and its return upwardly through the soil intermediate adjacent trenches.

In this type construction, the free water level in a trench may be higher than the barrier mat 86. Such a free water height is illustrated at 43' in FIG. 4, and as a result of this free water height 43' at a level higher than the mats 86, the water will pass upwardly through the capillary material 25 and downwardly through the adjacent soil on both sides of the trench where it will collect above the mats 86 and saturate the soil or capillary material above the mats to a level 43''. This may be found desirable as in promoting the initial growth of sod or of newly seeded lawn and for other purposes.

In most instances it will be found that although the capillary material extends to the upper surface 26, substantially coextensive with the adjacent surface 23 of the soil, this will not adversely affect the appearance of a lawn, as it has been found that the grass will very quickly turf over the upper surface 26 of the capillary material.

It has been found in practice that very little attention need be given to an irrigation system according to the present invention, in that it is inherently self-controlling in moisture supply to the soil, and only in rare instances, such as a malfunction of a float valve, will any undesirable irrigation be produced. As previously stated, the use of a restricted supply passageway, such as that provided through a narrow gauge tube 13 or the restricted passageway between a needle valve 68 and its valve seat 13', generally will limit undesirable flooding which might result from the malfunction of the main supply valve or by the clogging of some interconnecting water conducting member of the system.

Figure 10:
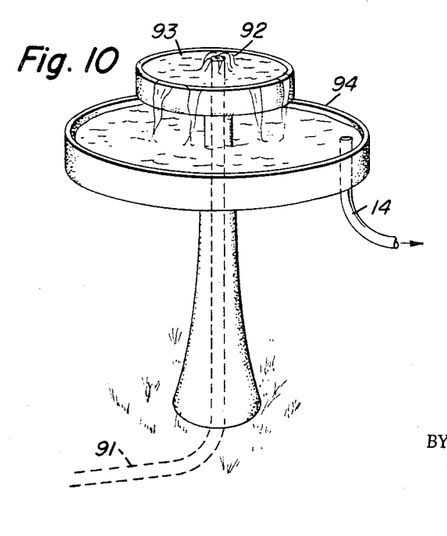
FIG. 10 illustrates a detail of an irrigation system incorporating the present invention for readily indicating malfunction of the system and also providing for readily supplying and evenly distributing fertilizing ingredients to the irrigation system.

An additional very practical precaution has been found to be very valuable in giving a continuous visual indication of the proper functioning of the system. Such a visual indication can readily be provided by arranging for the open flow of water in the supply to the system prior to its passage into the distributing system. This open flow may take a variety of forms and can very easily and practically provide both an esthetic enhancement of the area being irrigated, as well as an arrangement for easily and uniformly supplying nutrients to the vegetation being irrigated. FIG. 10 illustrates such a visual indicating device in the form of a bird bath. In this construction, the main water supply passes from the float valve 31 through a suitable conduit 91 and flows as a small fountain 92 from the end of the conduit 91 into a bird bath receptacle 93, from which it preferably overflows into a second bird bath receptacle 94. The water then is simply drained from the bottom of the bird bath receptacle 94 by connecting the main system supply conduit 14 thereto, with a suitable screen over its open end to prevent the entrance of foreign material thereinto. With such a construction, it is necessary, of course, that the bird bath be at an elevation such that the intake end of the conduit 14 extending into the bird bath receptacle 94 be sufficiently above this main supply conduit 14 and the highest header 16 of the system to assure that the water will flow by gravity into the irrigation system from the bird bath.

Other types of visual flow indicators can readily be devised which would include such esthetically pleasing contrivances as fern gardens, where the open water flow would pass downwardly over rocks in the fern garden and could be readily observed from a considerable distance. These visual flow indicators are especially practical in that they quickly and easily disclose any malfunction of the system because of the abnormal flow of water either as an increase or a decrease thereof. In addition, such visual indicators are very useful in areas where freezing temperatures could damage the irrigation system in that the exposed water in the visual flow indicator would tend to freeze before the remainder of the irrigation system, and this normally would give an adequate advance warning so that the irrigation system could be shut down during the freezing weather before damage thereto.

Another very important aspect of this type of accessory is that soluble nutrients for the vegetation being irrigated by the system can be placed in the water before it enters the distributing system, so that it will be evenly supplied to all parts of the system. If such nutrients are placed in the highest header there will be a tendency for the part of the distributing system connected directly to this header to receive a larger percentage of the nutrients than the parts of the system which are farther removed. On the other hand, if nutrients are placed equally in each of the headers, the overflow from each header to the next succeeding lower header will produce a progressively increasing concentration of nutrients in the progressively lower headers, so that nutrients again would not be evenly distributed throughout the system. Thus, if nutrients are added to the water in the visual flow indicator it assures against any part of the system receiving a disproportionately large share of the nutrients.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

The invention claimed is:

1. A subterranean irrigation system including a laterally extending trench, means including a perforate conduit extending substantially level along the bottom of said trench of freely conducting water therethrough, a water impermeable liner covering the bottom of said trench under said conduit and the sides thereof at least as high as said conduit and less than the full height thereof, water capillary feed material comprising a layer of fibrous material over said conduit in liquid feeding communication therewith and a fine granular material filling the remainder of the trench generally to a top surface coextensive with the top surface of adjacent soil and providing a water capillary feed contact with the adjacent soil near the top of the trench, means for supplying water to said conduit, and means for regulating the height of free water above said conduit in said capillary feed material and for maintaining said free water height for substantially all moisture conditions below saturation by natural or other extraneous non-irrigation system causes whereby the moisture content of the soil fed by said system can be regulated inherently to substantially fixed gradations evenly progressively diminishing away from said trench and into a progressively wider section downwardly from the top of said trench.

2. A subterranean irrigation system having a plurality of lateral trenches extending substantially along contour lines and having bottoms extending generally level, water freely conducting means along the bottom of each trench having a plurality of longitudinally spaced perforations therethrough for providing an outward feed of water therefrom, a water impermeable liner over the bottom of each trench under said water conducting means and covering the sides of the trench at least to a height as high as the top of said water conducting means and lower than the top of the trench to provide a substantial exposure of adjacent soil along the top of each side of the trench, water capillary feed material arranged over said water conducting means and filling the remainder of the trench to a level generally coextensive with the top surface of adjacent soil, means for supplying water to said water conducting means including separate headers for trenches at different contour lines with all of said water conducting means at the same contour line interconnected to the same header, means for regulating the height of free water in said capillary feed material and for maintaining said height for substantially all soil moisture conditions below saturation by natural or other extraneous non-irrigation system causes whereby the moisture content of the soil fed by said system can be regulated, means including a float valve water supply control connected between a source of water supply and the highest of said headers and responsive to the water level in the lowest of said headers, and means for visually indicating the flow of water in the system comprising a means providing for a visually open flow of water connected with both its supply and drain higher than the highest of said headers and between said float valve control and said highest header.

3. An irrigation system as defined in claim 2 wherein said means for visually indicating the flow of water comprises a bird bath.

4. A subterranean irrigation system having a plurality of lateral trenches extending substantially along contour lines and having bottoms extending generally level, water freely conducting means along the bottom of each trench having a plurality of longitudinally spaced perforations therethrough for providing an outward feed of water therefrom, a water impermeable liner over the bottom of each trench under said water conducting means and covering the sides of the trench at least to a height as high as the top of said water conducting means and lower than the top of the trench to provide a substantial exposure of adjacent soil along the top of each side of the trench, water capillary feed material arranged over said water conducting means and filling the remainder of the trench to a level generally coextensive with the top surface of adjacent soil, means for supplying water to said water conducting means, means connecting the sides of the water impermeable liners in adjacent trenches comprising a subterranean moisture barrier at a predetermined subsurface depth, and means for regulating the height of free water in said capillary feed material and for maintaining said height for substantially all soil moisture conditions below saturation by natural or other extraneous non-irrigation system causes whereby the moisture content of the soil fed by said system can be regulated.

5. An irrigation system as defined in claim 4 wherein said moisture barrier comprises an impermeable sheet.

6. An irrigation system as defined in claim 5 having a layer of water capillary-feed material over said sheet covered by plant growing soil.

7. A subterranean irrigation system including a plurality of laterally extending trenches with flared outer edges, water conduit means comprising a substantially level perforate conduit in the bottom of each trench, a water impervious liner covering the bottom of each trench under said conduit and most of the sides of the trench to at least a height above the top of said conduit means and not higher than the bottom of said flared outer edges, water capillary feed material over each conduit means and filling each trench to the adjacent soil top surface, said capillary feed material comprising a fibrous material covering said perforate conduits and a finely granular material filling the remainder of the trenches and being in direct contact with the adjacent soil at the sides of the tenches above said liners for providing a capillary migration of water from said capillary material through said contact into said adjacent soil, means including a separate header connected to said trench conduit means at each level for supplying water to said conduit means, means for regulating the head of water in each header whereby the height of free water above said conduit means is maintained substantially constant for all soil conditions below substantial saturation by natural or other extraneous non-irrigation system causes so as inherently to regulate the soil moisture to a substantially fixed gradation diminishing substantially inversely with the distance away from said trench and extending downwardly progressively outwardly from the trench directly with the depth from the top of the trench.

References Cited

UNITED STATES PATENTS

| | | | |
|---|---|---|---|
| Re. 20,736 | 5/1938 | Dimick | 61—11 |
| 302,322 | 7/1884 | Cole | 61—10 X |
| 1,129,554 | 2/1915 | Courtney | 61—13 |
| 1,171,558 | 2/1916 | Taylor. | |
| 1,604,189 | 10/1926 | Nelson. | |
| 2,052,020 | 8/1936 | Black | 61—13 |
| 2,084,005 | 6/1937 | Richards | 61—13 X |
| 2,309,233 | 1/1943 | Black | 61—13 |
| 2,134,647 | 10/1938 | Savage | 61—13 X |
| 2,653,449 | 9/1953 | Stauch | 61—13 |
| 2,763,991 | 9/1956 | Kennon | 61—13 |

FOREIGN PATENTS

| | | |
|---|---|---|
| 279,364 | 11/1930 | Italy. |
| 938,850 | 2/1956 | Germany. |
| 111,978 | 9/1964 | Czechoslovakia. |

EARL J. WITMER, *Primary Examiner.*